United States Patent
Rohit

(10) Patent No.: US 9,232,501 B2
(45) Date of Patent: Jan. 5, 2016

(54) INDEPENDENT RESOURCE REQUEST METHOD FOR INITIAL NAS SIGNALLING

(71) Applicant: Tejas Networks Ltd., Bangalore, Karnataka (IN)

(72) Inventor: Kumar Rohit, Bihar (IN)

(73) Assignee: Tejas Networks Ltd., Bangalore (IN)

( * ) Notice: Subject to any disclaimer, the term of this patent is extended or adjusted under 35 U.S.C. 154(b) by 46 days.

(21) Appl. No.: 13/940,329

(22) Filed: Jul. 12, 2013

(65) Prior Publication Data

US 2014/0016539 A1 Jan. 16, 2014

(30) Foreign Application Priority Data

Jul. 13, 2012 (IN) .......................... 2842/CHE/2012

(51) Int. Cl.
*H04W 72/04* (2009.01)
*H04W 74/08* (2009.01)
*H04W 84/04* (2009.01)

(52) U.S. Cl.
CPC .............. *H04W 72/04* (2013.01); *H04W 74/08* (2013.01); *H04W 84/047* (2013.01)

(58) Field of Classification Search
None
See application file for complete search history.

(56) References Cited

U.S. PATENT DOCUMENTS

| 2012/0002592 A1* | 1/2012 | Yang et al. ..................... 370/315 |
| 2012/0093081 A1* | 4/2012 | Hapsari et al. ................ 370/328 |
| 2012/0182929 A1* | 7/2012 | Chen et al. .................... 370/315 |
| 2013/0100876 A1* | 4/2013 | He ................................. 370/315 |
| 2013/0272190 A1* | 10/2013 | Du et al. ....................... 370/315 |

FOREIGN PATENT DOCUMENTS

| WO | WO 2010125937 A1 * 11/2010 |
| WO | WO 2011035733 A1 *  3/2011 |
| WO | WO 2011153716 A1 * 12/2011 |

* cited by examiner

*Primary Examiner* — Faruk Hamza
*Assistant Examiner* — Cassandra Decker
(74) *Attorney, Agent, or Firm* — Merchant & Gould P.C.

(57) ABSTRACT

A method for Independent resource request for initial NAS signaling in a communication network comprising of transporting service request message of both the UE and RN via Base station to management entity of Evolved Packet Edge (EPE) within Evolved Packet Core (EPC), as a signaling message over uplink channel referred to as "Independent Resource Request" (IR Request) message. The service request response message from one of the management entity of EPE or management entities of UE and RN within EPC are transported as a signaling message to EPE via Base station over the downlink channel referred to as "Independent Admission Response" (IA Response). This manages bearer setup signaling as a single loop, by transportation of "IR Request" signaling message over uplink and receiving "IA Response" signaling message over downlink channels.

8 Claims, 4 Drawing Sheets

INDEPENDENT RESOURCE REQUEST METHOD FOR INITIAL NAS SIGNALLING

CROSS REFERENCE TO RELATED APPLICATIONS

This application claims priority to Indian Patent Application No: 2842/CHE/2012 filed on Jul. 13, 2012, the entire content of which is hereby expressly incorporated by reference.

FIELD OF THE INVENTION

The present disclosure relates to independent resource request method for bearer management in a wireless communication network. In particular, the invention relates to transport of initial NAS signaling messages on the interface between a relay node and another node in a mobile communication network.

BACKGROUND

In order to provide better qualities of service and wider communication ranges between wireless nodes, the concept of relay station has been introduced in network systems. The purpose of deploying relay station or Relay Node (RN) in network system is to extend the serving coverage of base station; hence, user equipment (UE) which is not within the communication coverage of base station can access the services provided by relay node as well via base station.

Wireless network architecture as defined by 3GPP introduces wireless relay node (RN) entity to extend the coverage of base station (evolved Node B or eNodeB or eNB). A long term evolution-advanced (LTE-A) system, as its name implies, is an evolution of the LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover.

The Relay Node (RN) forms an independent physical cell. From a user equipment (UE) perspective, the RN is seen as a usual base station. The RN is connected via a wireless link to the base station. The relay node architecture deployment foresees that a RN emulates a base station for the UE, which means that the UE would see the RN as a usual base station. From the network side, the RN is seen as a usual UE by the base station. The base station or eNB, to which the RN is connected, is called Donor-eNB (DeNB) hereinafter, referred to as Base station or eNB and operates as a usual base station. The deployment of RN in the 3GPP network architecture is described in 3GPP Technical Specification 36.306; "Relay architectures for E-UTRA (LTE-Advanced)".

In order for the user equipment to receive a service from the network, it needs to establish connectivity via base station, and initiating Non-Access Stratum (NAS) signaling messages with network nodes like Mobility Management Entity (MME) serving the UE. Consequential signaling messages are exchanged between network nodes to allocate bearer resources for UE and RN to service the UE request. The above bearer management procedure can be initiated by UE or the Evolved Packet Core (EPC in terms of 3GPP LTE) or simply the communication network.

Thus, whenever an initial UE bearer is created, the RN bearer create or modify procedures may be initiated by the RN. This increases the latency for the RN to modify/create a new bearer to service the UE. Thus, some latency is introduced by the RN, when a bearer or multiple bearers are created for a UE during connection establishment, leading to delayed access service. Therefore, there is a need for a bearer management to optimize resources by effectively setting-up the bearers.

SUMMARY OF THE INVENTION

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below.

The present invention and its embodiments are made to provide for a feasible solution for facilitating independent resource request method in a communication network optimizing exchange of initial NAS signaling communication in managing bearers for UE and RN.

An aspect of the invention provides for a method of managing initial NAS signaling in a communication network, by transporting "Independent Resource Request" (IR Request) signaling message from Evolved Packet Edge (EPE) entities to management entities of EPE via Base station and receiving "Independent Admission Response" (IA Response) signaling message for the transported "Independent Resource Request" from at least one of the said management entity of EPE by Base station, wherein the said management entity serves/manages all the entities in the EPE. EPE is a conglomeration of network nodes comprising of user equipment, relay node and all other network nodes that communicate over Evolved Packet Core (EPC) via Base station. Network nodes in the EPE may establish connectivity external to EPC like Internet or PSTN (Public Switch Telephone Network).

Another aspect relates to receiving "Independent Admission Response" (IA Response) signaling message for the transported "Independent Resource Request" from management entities of EPE by the Base station, wherein at least one of the said management entities are not serving/managing the same entities in the EPE. "Independent Admission Response" message comprises of granted bearer resources for UE and RN received independently by Base station from management entity or entities of EPE.

Another aspect relates to network nodes like RN, MME_UE, MME_RN and systems facilitating the above method of managing bearers each comprising of at least a receiver, for receiving the said messages, processors for executing the functions, transmitter for transmitting messages, a memory for storing information and retaining instructions for executing functions associated with the above methods.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The features, advantages and other aspects of the embodiments of the present invention will be obvious to any person skilled in the art to appreciate the invention when read with the following description taken in conjunction with the accompanying drawings.) and relay nodes (RNs) as specified in 3GPP LTE (A) network architectures.

The figures are not drawn to scale and are illustrated for simplicity and clarity to help understand the various embodiments of the present invention. Throughout the drawings it should be noted that like reference numbers are used to depict the same or similar elements, features and structures.

DETAILED DESCRIPTION

Figure 1:
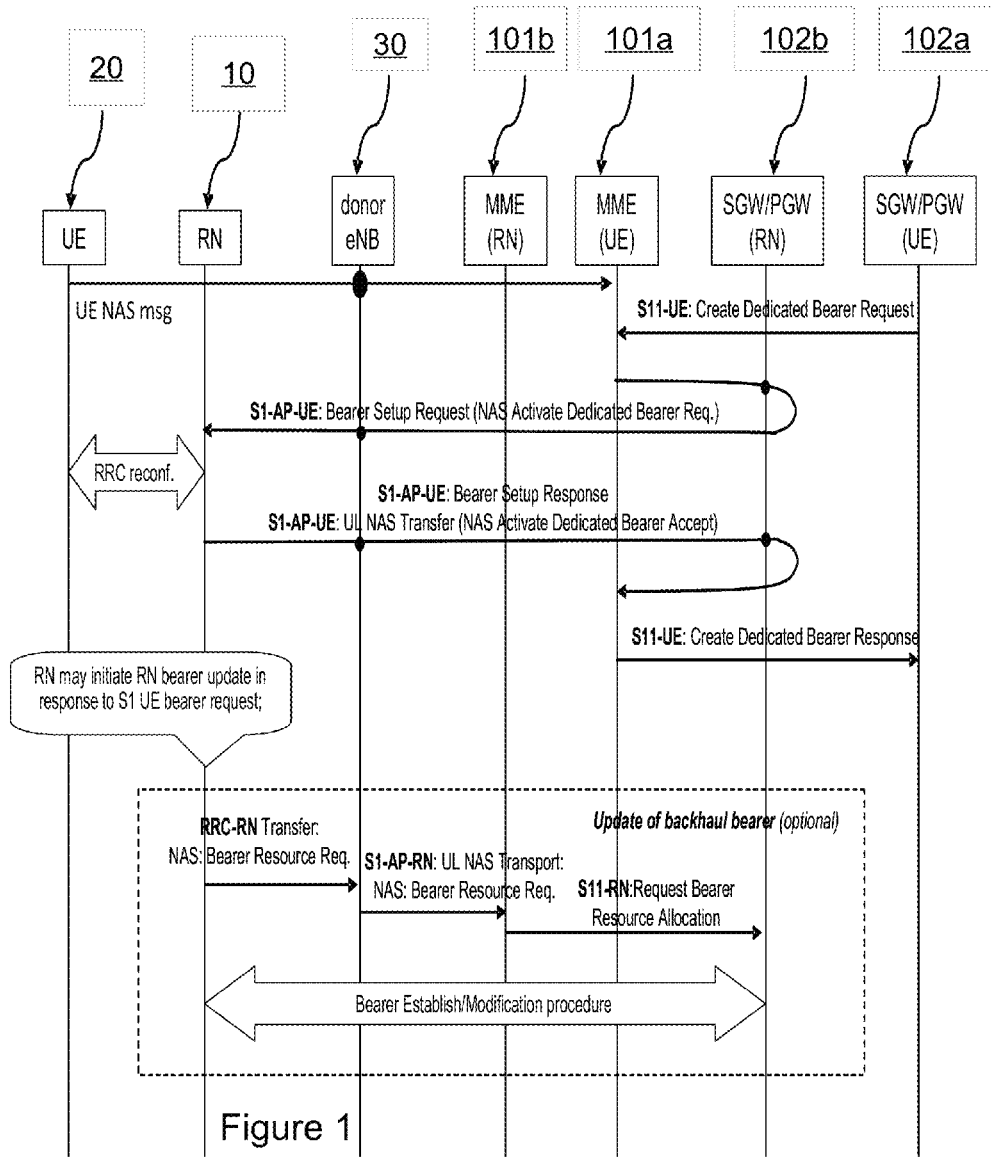
FIG. 1 is an illustration of existing bearer establishment procedure for user equipments (UE) and relay node (RN) as specified in 3GPP LTE (A) network architectures.

The following descriptions with reference to the accompanying drawings are provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. The terms, component, module, system, and the like are intended to refer to an entity or entities within a communication network node comprising of; hardware, software, a combination of hardware and software. For e.g., a component may be, but not limited to being, a process running on a processor, a processor, an integrated circuit, or a computer. Both an application running on a computing device and the computing device can be a component. A component may be localized on one computer and/or distributed between two or more computers. The components may communicate by way of local and/or remote processes.

The present invention and its embodiments are mainly described in relation to 3GPP specifications and standards (LTE-Advanced) for applicability of certain exemplary embodiments. The terminology used is therefore related thereto. Such terminology is used in the context of describing the embodiments of the invention and it does not limit the invention in any way. Any other network architecture or system deployment, etc., may also be utilized as long as it is compliant with the features described herein.

In particular, embodiments of the present invention may be applicable in any relay-enhanced (cellular) system with a need for signaling optimization. Embodiments of the present invention may be applicable for/in any kind of modern and future communication network including any mobile/wireless communication networks/systems.

The following paragraphs will describe various embodiments of the invention. For exemplary purposes only, most of the embodiments are outlined according to the LTE-Advanced mobile communication system with the solution to the problem discussed in the background. The explanations given below are intended to better understand specific exemplary embodiments described herein and should not be understood as limiting the invention to the specific implementations of processes and functions in a mobile communication network. The improvements/solutions proposed herein may be readily applied in architectures/systems having relevance to relay architectures. Some embodiments of the invention may also make use of standard and improved procedures of these architectures/systems.

The techniques described herein may be used for various wireless communication networks such as Code Division Multiple Access (CDMA) networks, CDMA implementing radio technology such as Universal Terrestrial Radio Access (UTRA), Time Division Multiple Access (TDMA) networks, TDMA implementing radio technology such as Global System for Mobile Communication (GSM), Frequency Division Multiple Access (FDMA) networks, Orthogonal Frequency Division Multiple Access (OFDMA) networks, OFDMA implementing radio technology such as Evolved URTA (E-UTRA), SC-FDMA networks.

User equipment (UE) used in the following description denotes various terminologies used like an access terminal (AT), wireless communication device, terminal, wireless handset, computer or wireless module, wireless module for use with a computer, personal digital assistant (PDA), tablet computer or device.

In the overall architecture of a network with a relay node (RN), a relay node has a Base station and a terminal side called as user equipment (UE). Towards UE the RN behaves as a conventional eNB using the access link (Uu interface) and the UE is not aware of whether it is communicating with a relay node or a base station. Relay nodes are therefore transparent for the UE. Towards base stations relay nodes initially operate as a UE using the radio interface to connect to the base station. Once connection is established and the relay node is configured, the relay uses a subset of the UE functionality for communication on the backhaul link (Un interface). In relay architecture eNB acts as a proxy between the core network and the relay node.

The UEs are connected to the RN by means of a Uu interface and the RN to the eNB by means of Un interface. When the network e.g., Mobility Management Entity (MME) has no valid location or routing information for the UE, the UE cannot be reached. This is more likely when the UE is in a state of switched off, or out of coverage area. 3GPP defines this state as a de-registered state and this could also happen when the UE is in non-3GPP access. When the UE is attached to the network e.g., MME, it can receive Core Network services. This state is defined by 3GPP as registered state. In this registered state the UE can be in two different connection management states like RRC_IDLE state and RRC_CONNECTED state. When no data is being transmitted and the radio resources are released, the UE has a valid IP configuration. In such idle state there is no Non-Access Stratum (NAS) signaling connection between the UE and the network, e.g., MME. Also during the idle state there is no S1 connection between the eNB and the Serving Gateway. In the RRC_CONNECTED state, there is an active connection between the UE and eNB, which implies a communication context being stored within the eNB for this UE. Both sides can exchange user data and or signaling messages.

From the wireless network perspective, protocol structure for the User and Control planes correspond to user data transmission and signaling transmission. Control plane corresponds to the information flows actually considered as signaling by Evolved Universal Terrestrial Radio Access Network (E-UTRAN) and Core Network. This includes all the RRC (Radio Resource Control) E-UTRAN signaling (supporting functions such as Radio Bearer management, radio mobility, user paging) and NAS (Non Access Stratum) signaling. On the radio interface, the Control plane uses the Control plane protocol stack namely PDCP (Packet Data Convergence Protocol), RLC (Radio Link Control), MAC (Medium Access Control) and PHY (Physical) stack to transport both RRC and Core Network NAS signaling. The above protocol stack layers support the same functions for both the User and Control Planes. When a Non-Access Stratum (NAS) signaling connection needs to be established between UE and the MME routed via relay node, the UE and the MME shall enter the connected state. It should be noted that it is possible that an eNB can have connections to one or more MMEs and Serving-Gate Way (S-GW) node.

FIG. 1 shows the initial NAS signaling message for bearer initiation procedure existing in 3GPP LTE specification. UE 20 sends an initial NAS message or service request to the MME_UE 101a, which is routed through RN 10 and eNB 30. When a NAS layer in the UE has to send an initial NAS message denoted as 'UE NAS Msg' in FIG. 1, the UE first initiates the establishment of the Radio Resource Control (RRC) connection over the Uu interface. The RRC procedures are elaborated in 3GPP specification TS 36.331 available at www.3gpp.org. In parallel to the establishment of the RRC connection over the Uu interface, the RN initiates the establishment of the RRC connection over the Un interface. The RRC connection establishment procedure over the Uu and Un interfaces are as per the 3GPP specification.

The NAS message is directed to MME (UE) 101a and the RN 10 is transparent. The MME_UE 101a understands the message and forwards it to the SGW/PGW_UE 102a for checking the UE subscription data. Then the SGW/PGW_UE 102a in conjunction with PCRF (not shown) authorizes MME_UE 101a to create a dedicated bearer and sends the message over S11 interface (Interface between S/PGW and MME). On receiving the response, MME_UE 101a sends bearer setup request to the UE 20 as an S1-AP message routed through RN 10. RN 10 understands this S1-AP message and initiates RRC configuration between UE 20 and RN 10. UE 20 sends RRC Reconfiguration Complete to RN 10. Then RN 10 sends initial context setup response to MME_UE 101a. A bearer setup response may be sent by UE 20 to MME_UE 101a routed via RN 10 and eNB 30 at NAS level. This process establishes radio bearers to enable data flow from the SGW/PGW_UE 102a to the UE 20. After completion of this procedure, the RN 10 may send a NAS message seeking bearer-resource request to MME_RN 101b via eNB 30. MME_RN 101b understands the message and provisions bearer resource allocation to RN 10. Upon receiving bearer resource allocation, RN 10 bearer establishment is completed. Radio resources for the relay node 10 are allocated so as to serve the already established UE's bearer requirements. Thus in the above instances, whenever an initial UE 20 bearer is created, the RN bearer, modify or create may be initiated subsequently by the RN 10. Thus, some latency is introduced by the RN, when a bearer or multiple bearers are created for a UE during connection establishment, leading to delayed access service.

Figure 2:
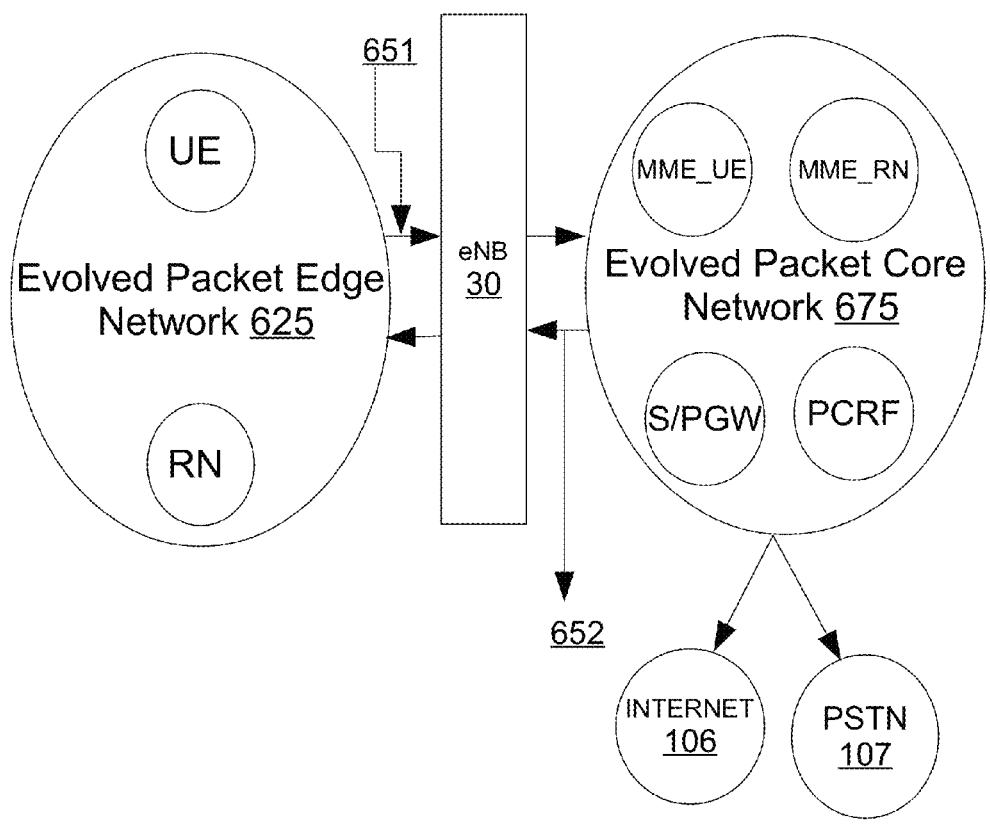
FIG. 2 shows the network nodes conglomeration between two network entities in accordance with the principles of the invention.

FIG. 2 shows the network nodes conglomeration between two network entities in accordance with the principles of the invention. Network entity 625 is called as Evolved Packet Edge (EPE) comprising of plurality of network nodes like UE, RN and all other nodes that communicate with Evolved Packet Core Network entity 675 via Base station 30. Network nodes in the EPE 625 may establish connectivity external to EPC like Internet 106 or PSTN (Public Switch Telephone Network) 107. EPC entity 675 comprises of network nodes like Mobility Management Entity (MME), Serving gate way/Packet gate way (S/PGW), Policy of Charging Rules Function (PCRF) etc. These nodes essentially manage the entities in the EPE. For e.g., a UE bearer resource request is processed and allowed only by the MME serving the UE. Without any loss of generality, it is appropriate to indicate MME serving the UEs as MME_UE and MME serving the RNs as MME_RN. It can happen that MME serving the UEs and RNs respectively can be one single MME.

As part of bearer management signaling as envisaged, a communication from EPE 625 comprising of initial bearer resource request of UE and the consequential bearer resource request of RN is transported via Base station 30 to EPC 675 as a single signaling message over uplink channel hereinafter referred to as "Independent Resource Request" (IR Request) message. The response message comprising of bearer resource response from either one of the managing entity or managing entities of EPC 675 are transported as a single signaling message to Base station 30 over the downlink channel 652 hereinafter referred to as "Independent Admission Response" (IA Response). This manages bearer setup signaling loop, with a single transportation of 'IR Request' signaling message and receiving "IA Response" signaling message over uplink and downlink channels respectively.

When the UE 20 is in the de-registered state, UE NAS signaling message that initiates a transition from the de-registered state to the connected state are 'Attach Request', 'Tracking Area Update Request', 'Service Request' or 'Detach Request'. The UE NAS message received as part of RRC Connection Setup Complete is initial UE NAS message which is not an encrypted message. If the UE has valid security parameters stored, then the initial UE NAS message shall be integrity protected. The request of UE 20 for allocating bearer resources is referred to as 'service request' message.

Figure 3:
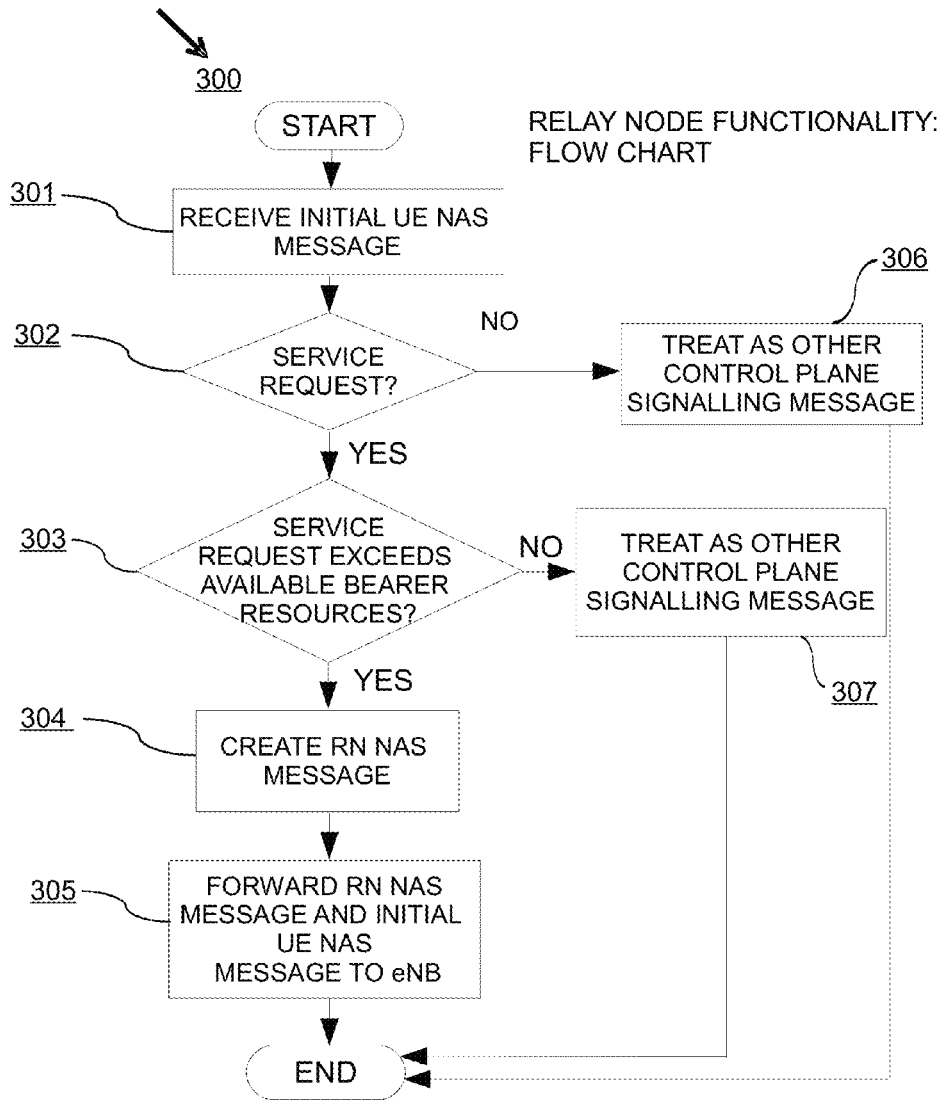
FIG. 3 is the flow chart of the functions performed by the relay node in accordance with the embodiments of the invention.

FIG. 3 is the flow chart representing the functionality 300 performed by the relay node 10, in accordance with the embodiments of the invention. As described above, the embodied functionality of RN 10 begins at 301 wherein it receives initial UE NAS Message and at 302, the initial UE NAS message is checked by the RN to identify whether it is a 'service request' message. If the received message is a 'service request' message then at 303 the RN checks whether the requested bearer resources of UE are not within the available resources of the RN to cater to the said UE service request. If the UE service request is not within its available resources, then at 304, RN creates an RN NAS message, essentially a service request message for the RN, so as to serve UE service request. At 305, the relay node forwards UE service request and RN NAS message to Base station as "Independent Resource Request" messages. At 302, if the RN finds that the received message is integrity protected or that the received message is not a 'service request' message, or finds at 303, that the UE service request is within its available resources so as to cater to the UE bearer requirements then the RN handles the received initial UE NAS message as other control plane signaling message at the above stages of 306 and 307 respectively. "Independent Resource Request" messages received by the Base station are forwarded to the respective management entities of EPE.

Figure 4:
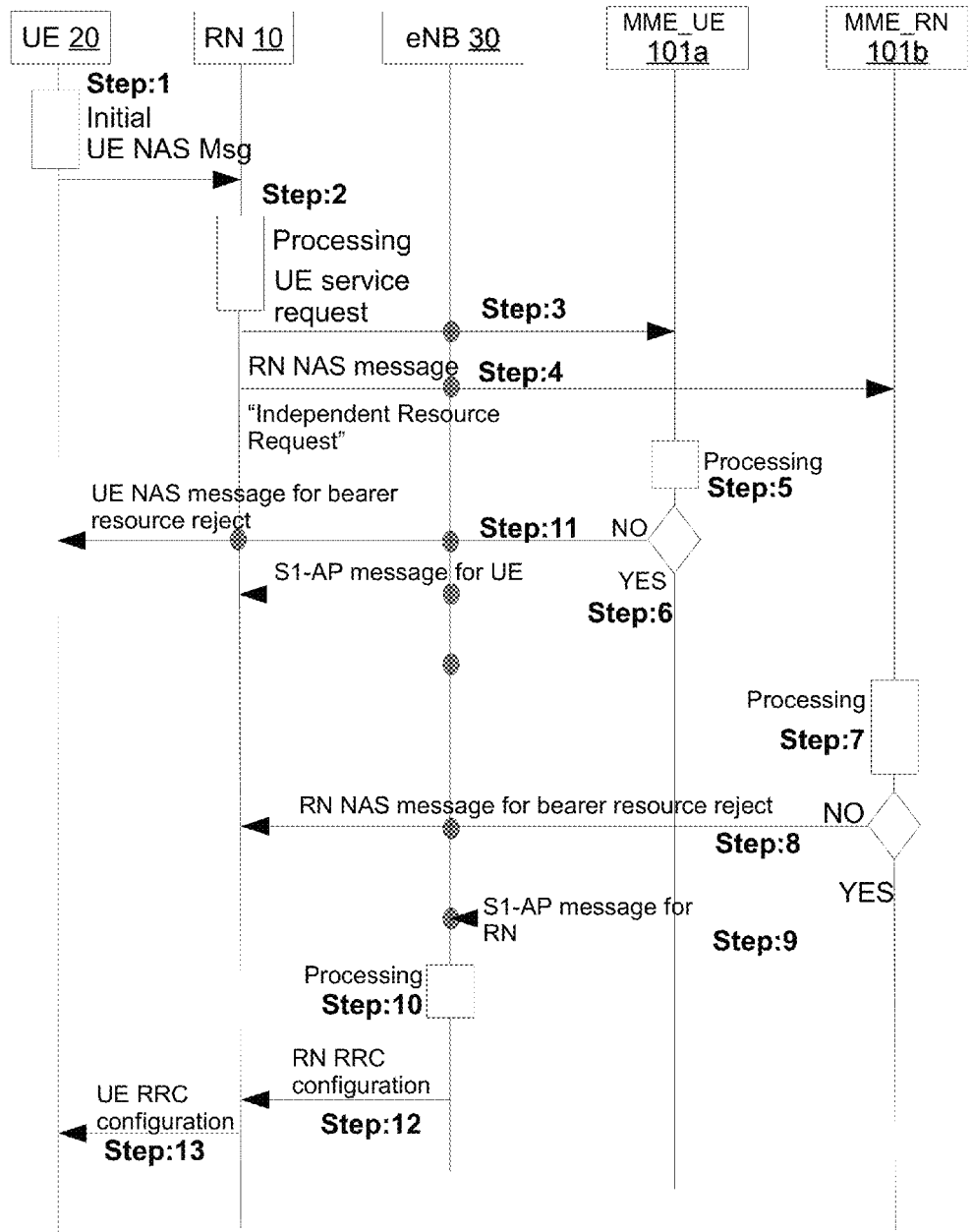
FIG. 4 represents initial UE NAS bearer establishment signaling loop in accordance with various aspects of the invention.

FIG. 4 represents initial bearer setup signaling loop, with a single transportation of "Independent Resource Request" signaling message by EPE entities and receiving "Independent Admission Response" signaling message by Base station over uplink and downlink channels respectively, in accordance with the embodiments of the present invention. Initial UE NAS message that is generated by UE 20 (Step 1) is received by RN 10 (Step 2). The RN 10 performs the functions as explained with regard to FIG. 3. After finding that the message received is an UE service request message, it is forwarded to the MME_UE 101a via Base station (eNB) 30 (Step 3). Simultaneously, RN NAS message generated by RN 10 is also forwarded to the MME_RN 101b via Base station 30 (Step 4). These messages are transported as "Independent Resource Request" signaling messages to the respective management entities via Base station. The MME_UE 101a upon receiving the UE service request message processes (Step 5) UE 20 service request and grants initial UE service request. If MME_UE 101a grants the request, an 'S1-AP message for UE' is generated and forwarded to Base station 30 (Step 6). Base station 30 receives the 'S1-AP message for UE' and forwards to RN 10. If the MME_UE 101a does not grant UE 20 bearer request, then MME_UE 101a generates 'UE NAS message for bearer resource reject' and forwards it for UE 20 via Base station 30 (Step 11).

The "Independent Resource Request" messages generated by the RN are essentially a service request message. The RN requests bearer resource to serve UE bearer Quality of Service (QoS) requirements. MME_RN 101b processes RN 10 service request. The MME_RN 101b upon receiving the RN NAS message understands it to be a service request of the relay node and processes (Step 7) RN 10 service request and grants utmost RN service request. If MME_RN 101b grants the request, an 'S1-AP message for RN' is generated and forwarded to Base station 30 (Step 9). If the MME_RN 101b does not grant RN 10 bearer request, then MME_RN 101b generates 'RN NAS message for bearer resource reject' and forwards it for RN 10 via Base station 30 (Step 8). Base station 30 processes the received 'S1-AP message for RN' (Step 10) and performs RRC configuration (Step 12) for the downstream relay node and forwards 'S1-AP messages for the remaining EPE entities. Performing RRC configuration for the downstream relay node by Base station and performing RRC configuration by relay node to the UE 20 (Step 13) are similar to those functions elaborated in 3GPP specification. For the sake of clarity, MME_UE processing the UE NAS message and MME_RN processing the RN NAS message are independent processes and can happen in parallel.

"Independent Admission Response" (IA Response) that is available to Base station 30 comprises of bearer resource allocation message pertaining to the respective EPE entities. For e.g., if MME_UE grants UE service request x to UE (Y), it generates an 'S1-AP message for UE' and forwards to Base station which may be in the form of Y(x). Similarly RN NAS messages seeking bearer allocation for the relay node 'P' is forwarded to the respective MME_RN. MME_RN may grant the same resources 'x' to the relay node 'P'. In such cases MME_RN serving the RN 'P' may generate an 'S1-AP message for RN' which may be in the form of x(P) and forward it to Base station. The "Independent Admission Response" from MME_UE i.e., Y(x), is understood by the Base station as a message comprising of allocated bearer resources corresponding to the value of 'x' to UE.

"Independent Admission Response" from MME_RN i.e., x(P) is understood by the Base station as a message comprising of allocated bearer resources corresponding to the value of 'x' for the relay node 'P'. In the above given example, in case MME_RN grants bearer resources for the relay node 'P' corresponding to the value less than the granted value of UE i.e., 'x−a', then the 'S1-AP message for RN' would be in the form b(P), (where x−a=b). When this "Independent Admission Response" message is received by Base station, it understands as a message comprising of allocated bearer resources corresponding to the value of 'b' for the relay node 'P'. It is also possible that MME_RN managing the relay node 'P' denies granting any of the bearer resources for the relay node 'P', then the "Independent Admission Response" message that is generated by MME_RN would be 'P( )'. When this "Independent Admission Response" is received by the Base station, it understands as a message comprising of 'RN NAS message for bearer resource reject'. It should be noted that in case of a single management entity (like, MME) serving all the entities in the EPE, the above functions of independently allocating or denying service requests of UE and RN are performed by that management entity alone as illustrated above.

Another embodiment of the invention relates to the implementation of the above described various embodiments using hardware and software. It is recognized that the various embodiments of the invention may be implemented or performed using computing devices (processors). A computing device or processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It is to be noted that respective functional blocks or elements according to above-described aspects can be implemented by any known means, either in hardware and/or software, respectively, if it is only adapted to perform the described functions of the respective parts. The mentioned method, steps can be realized in individual functional blocks or by individual devices, or one or more of the method, steps can be realized in a single functional block or by a single device.

The present invention also covers any conceivable combination of method steps and operations described above, and any conceivable combination of nodes, apparatuses, modules or elements described above, as long as the above-described concepts of methodology and structural arrangement are applicable.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

I claim:

1. A method for initial NAS signaling in a communication network, the method comprising:
forming an Independent Resource (IR) Request message for an initial user equipment non-access stratum (UE NAS) message in an Evolved Packet Edge (EPE) network,
wherein the EPE network comprises at least a user equipment (UE) and one relay node (RN), and wherein forming the IR request comprises:
receiving the initial UE NAS message,
determining that the received initial UE NAS message is a UE service request message,
determining, based on the determination that the initial UE NAS message is a service request message, that a requested bearer resource in the UE NAS message is within available resources of the RN,
creating, based on the determination that the requested bearer resource is not within the available resources of the RN, a relay node NAS (RN NAS) message for the initial UE NAS, the RN NAS message comprising a RN service request message to serve the UE service request, and forming the IR request message comprising the RN service request message and the UE service request message;

transporting the IR Request message from the EPE via a Base station to a managing entity within an evolved packet core (EPC), wherein the managing entity is one or more network nodes that manage or administer the UE and the RN, wherein the managing entity is at least one of the following: a mobility management entity serving the user equipment (MME_UE), a mobility management entity serving the relay node (MME_RN), a serving gate way (SGW), a packet gate way (PGW), a Policy Charging Rules Function (PCRF), and a Home Subscriber Server (HSS); and receiving Independent Admission (IA) Response via the Base station for the transported IR Request message from the managing entity, wherein receiving the IA response comprises:

receiving a first bearer resource allocation for the UE from the managing entity, and receiving a second bearer resource allocation, for serving the UE, for the RN from the managing entity.

2. The method of claim 1, wherein transporting the IR request message comprises simultaneously transporting both the UE NAS message and the RN NAS message.

3. A method for initial non-access stratum (NAS) signaling in a communication network, the method comprising:

forming an Independent Resource (IR) Request message for an initial user equipment NAS (UE NAS) message in an Evolved Packet Edge (EPE) network, wherein the EPE network comprises a user equipment (UE) and a relay node (RN), and wherein forming the IR request comprises:

receiving the initial UE NAS message, determining that the received initial UE NAS message is a UE service request message, determining, based on the determination that the initial UE NAS message is a service request message, that a requested bearer resource in the UE NAS message is within available resources of the RN, creating, based on the determination that the requested bearer resource is not within the available resources of the RN, a relay node NAS (RN NAS) message for the initial UE NAS, the RN NAS comprising a RN service request message to serve the UE service request, and forming the IR request message comprising the RN service request message and the UE service request message;

transporting the IR Request message from the EPE network via a Base station to a managing entity within an evolved packet core (EPC), wherein the managing entity comprises one or more network nodes that manage or administer the UE and the RN; and receiving Independent Admission (IA) Response from the Base station for the transported IR Request, from the managing entity within the Evolved Packed Core (EPC), wherein receiving the IA response comprises:

receiving a first bearer resource allocation for the UE from the managing entity, and receiving a second bearer resource allocation, for serving the UE, for the RN from the managing entity.

4. The method of claim 3, wherein transporting the IR request message comprises simultaneously transporting both the UE NAS message and the RN NAS message.

5. A network comprising:
a user equipment (UE);
a base station;
a managing entity; and
a relay node (RN); wherein the RN is configured to:
form an independent resource (IR) request message for an initial user equipment non-access stratum (UE NAS) message in an Evolved Packet Edge (EPE) network, wherein the EPE network comprises at least a user equipment (UE) and one relay node (RN), and wherein the RN being configured to form the IR request message comprises the RN further being configured to:

receive the initial UE NAS message, determine that the received initial UE NAS message is a UE service request message, determine, based on the determination that the initial UE NAS message is a service request message, that a requested bearer resource in the UE NAS message is within available resources of the RN, create, based on the determination that the requested bearer resource is not within the available resources of the RN, a relay node NAS (RN NAS) message for the initial UE NAS, the RN NAS comprising a RN service request message to serve the UE service request, and form the IR request message comprising the RN service request message and the UE service request message;

transport the IR request message from the EPE via the base station to the managing entity within an evolved packet core (EPC), wherein the managing entity is one or more network nodes that manage or administer the UE and the RN; and receive independent admission (IA) response via the base station for the transported IR Request from the managing entity, wherein the received IA response comprises:

a first bearer resource allocation for the UE from the managing entity, and a second bearer resource allocation, to serve the UE service request, for the RN from the managing entity.

6. The network system of claim 5, wherein the managing entity is at least one of the following: a mobility management entity serving the user equipment (MME_UE), a mobility management entity serving the relay node (MME_RN), a serving gate way (SGW), a packet gate way (PGW), a Policy Charging Rules Function (PCRF), and a Home Subscriber Server (HSS).

7. The network system of claim 5, wherein the network system is a wireless communication network and is at least one of the following: a Code Division Multiple Access (CDMA) networks, a Universal Terrestrial Radio Access (UTRA) network, a Time Division Multiple Access (TDMA) network, a Global System for Mobile Communication (GSM) network, a Frequency Division Multiple Access (FDMA) network, an Orthogonal Frequency Division Multiple Access (OFDMA) network, and a Evolved URTA (E-UTRA) network.

8. The network system of claim 5, wherein the RN is transparent to the UE.

* * * * *